UNITED STATES PATENT OFFICE.

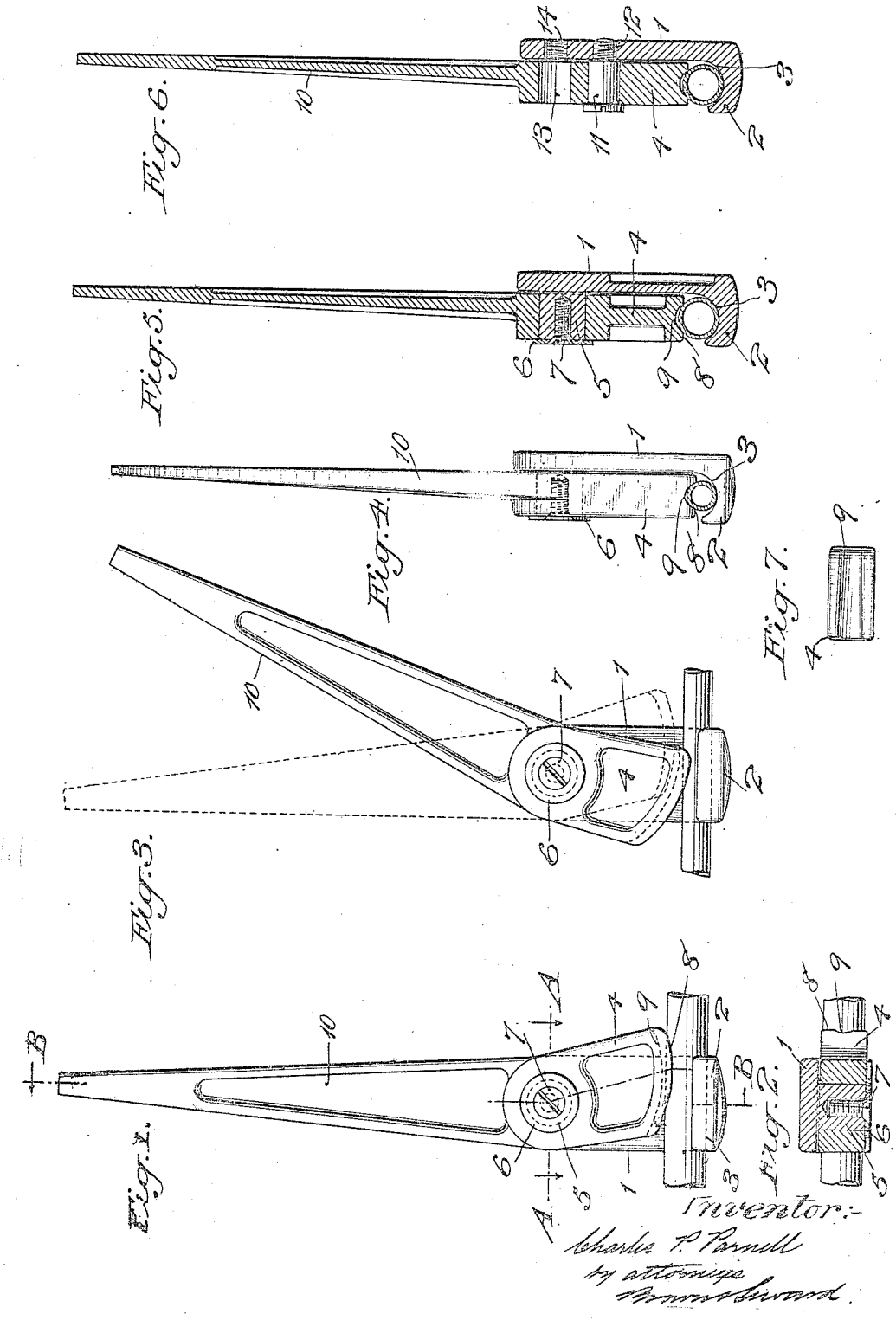

CHARLES P. PARNELL, OF NEW YORK, N. Y., ASSIGNOR OF ONE-HALF TO GEORGE E. KING, OF NEW YORK, N. Y.

DEVICE FOR BENDING PIPES.

1,267,798.  Specification of Letters Patent.  Patented May 28, 1918.

Application filed April 25, 1916. Serial No. 93,534.

*To all whom it may concern:*

Be it known that I, CHARLES P. PARNELL, a citizen of the United States, and resident of the borough of Richmond, in the city and State of New York, have invented a new and useful Improvement in Devices for Bending Pipes, of which the following is a specification.

This invention relates to an improvement in a device for bending pipes, with the object in view of providing a device which will hold a pipe so that it may be readily bent longitudinally to any desired shape or angle.

Another object is to provide a device the members of which will automatically adjust themselves to grip pipes of various diameters.

A still further object is to provide certain improvements in the form, construction and arrangement of the parts whereby the above and other objects may be effectively carried out.

This invention is particularly well adapted for the use of electricians, gas and steam fitters and plumbers, or for use where it would be more convenient to bend pipes to conform to certain requirements, than to cut, fit and couple the pipes.

A practical embodiment of my invention is represented in the accompanying drawings, in which—

Figure 1 represents a side elevation of the device as applied to a pipe,

Fig. 2 represents a horizontal section taken in the plane of the line A—A of Fig. 1, Fig. 3 represents a view similar to Fig. 1 of the device as applied to a pipe of another diameter, Fig. 4 represents an end elevation of the same, Fig. 5 represents a longitudinal section taken in the plane of the line B—B of Fig. 1, Fig. 6 represents a similar view of a modified form of jaw and pivot, and Fig. 7 represents a face view of one of the members.

The device comprises a member 1 having an offset portion 2, and a longitudinal groove 3 for the reception of a pipe to be bent, and a swinging jaw 4 which coöperates with the offset portion 2 to engage the pipe upon the opposite side therefrom.

In Figs. 1 to 5 inclusive, the jaw 4 is arranged to swing on a hub 5 carried by the member 1, and is held thereon by means of a washer 6 and a screw 7, which has a threaded engagement in the end of the hub 5. The jaw 4 is provided with a convex cam face 8 which has formed therein a longitudinal tapered groove 9. This groove 9 is of such proportions throughout its length that it will engage pipes of various diameters upon opposite sides of their longitudinal vertical central planes, thus avoiding any crushing effect due to straining or overpressure while being bent, as well as preventing the pipe from turning or rolling during the operation.

The jaw 4 is also provided with a handle 10 which is of sufficient length to afford the operator a firm hold or lever with which the pipe is manipulated.

In operating the device, the jaw 4, with its handle 10, is thrown to the position shown in dotted lines in Fig. 3, which position leaves a space between it and the longitudinal groove 3 in the offset portion 2 of the member 1, so that a pipe may be laid therein. After the pipe is placed in the groove 3, the handle 10 is pulled toward the operator to the position shown in Figs. 1 and 3, where the convex cam face 8 with its tapered groove 9 will engage the pipe and hold it against slipping while the further process of bending progresses. The device may be readily disengaged from the pipe, or the jaw released and the device slid along the pipe to another position if so desired.

It will be seen in Figs. 1 to 5 inclusive that the jaw 4 has a fixed fulcrum while in Fig. 6 the pivot is in the form of a stud bolt 11 which has a screw threaded engagement with the member 1, as shown at 12. In this form, the stud bolt 11 may be moved to the hole 13 in the member 4 and screwed into the threaded hole 14 in the member 1, thus shortening the leverage on the handle 10 and giving a more gradual or longer bite to the jaw 4.

While I have described the device as a tool for bending pipes, I wish it understood that it may be used to grip or bend solid bars or rods.

It is obvious that various changes may be resorted to in the form, construction and arrangement of the parts without departing from the spirit and scope of my invention, and hence I do not intend to be limited to the specific details herein described except as they may be set forth in the claims.

What I claim is:

1. A device of the character described comprising a member having an offset portion forming an extended longitudinal bearing for the pipe to be bent, a jaw pivoted to said member and arranged to swing longitudinally of the pipe, said jaw being provided with a cam face arranged to coact with said offset portion for clamping and releasing the pipe, said cam face having a longitudinal groove to receive the pipe, and a handle connected to the jaw for operating it and manipulating the device.

2. A device of the character described comprising a member having an offset portion forming an extended longitudinal bearing for the pipe to be bent, a jaw pivoted to said member and arranged to swing longitudinally of the pipe, said jaw being provided with a cam face arranged to coact with said offset portion for clamping and releasing the pipe, said cam face having a longitudinally tapered groove to receive the pipe, and a handle connected to the jaw for operating it and manipulating the device.

3. A device of the character described comprising a member having an offset portion, said offset portion having a longitudinal groove forming an extended longitudinal bearing for the pipe to be bent, a jaw pivoted to said member and arranged to swing longitudinally of the pipe, said jaw being provided with a cam face arranged to coact with said offset portion for clamping and releasing the pipe, said cam face having a longitudinal groove to receive the pipe, and a handle connected to the jaw for operating it and manipulating the device.

4. A device of the character described comprising a member having an offset portion, said offset portion having a longitudinal groove forming an extended longitudinal bearing for the pipe to be bent, a jaw pivoted to said member and arranged to swing longitudinally of the pipe, said jaw being provided with a cam face arranged to coact with said offset portion for clamping and releasing the pipe, said cam face having a longitudinally tapered groove to receive the pipe, and a handle connected to the jaw for operating it and manipulating the device.

In testimony, that I claim the foregoing as my invention, I have signed my name this 21st day of April 1916.

CHARLES P. PARNELL.